US012649492B2

(12) United States Patent　(10) Patent No.:　US 12,649,492 B2
Lau et al.　(45) Date of Patent:　Jun. 9, 2026

(54) CONSTRAINT-BASED SPEED PROFILE

(71) Applicant: Nissan North America, Inc., Franklin, TN (US)

(72) Inventors: Derek Lau, San Francisco, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 223 days.

(21) Appl. No.: 18/240,860

(22) Filed: Aug. 31, 2023

(65) Prior Publication Data

US 2025/0074473 A1　Mar. 6, 2025

(51) Int. Cl.
　*B60W 60/00*　(2020.01)
　*B60W 30/095*　(2012.01)
　*B60W 40/105*　(2012.01)

(52) U.S. Cl.
　CPC ....　*B60W 60/0027* (2020.02); *B60W 30/0956* (2013.01); *B60W 40/105* (2013.01); *B60W 2554/80* (2020.02)

(58) Field of Classification Search
　CPC ......... B60W 60/0027; B60W 30/0956; B60W 40/105; B60W 2554/80; B60W 2554/802; B60W 30/0953; B60W 50/0097; B60W 60/0015; B60W 2554/4042; B60W 2555/60; B60W 2556/40; B60W 2720/10; B60W 2720/103; B60W 30/143; B60W 30/18154; B60W 60/0011
　See application file for complete search history.

(56) References Cited

U.S. PATENT DOCUMENTS 11,377,120 B1 *　7/2022　Deng ................ B60W 30/0956
11,823,461 B1 *　11/2023　Song ..................... G01S 13/931
2006/0293856 A1 *　12/2006　Foessel ................. B60W 30/09
　　　　　　　　　　　　　　　　701/301

(Continued)

FOREIGN PATENT DOCUMENTS

DE　102021105342 A1 *　9/2022
EP　　4086875 A1　11/2022
WO　2021/021269 A1　2/2021

OTHER PUBLICATIONS

Translation of DE 102021105342 A1 retrieved from Espacenet on Apr. 10, 2025 (Year: 2025).*

(Continued)

*Primary Examiner* — Fadey S. Jabr
*Assistant Examiner* — Faris Asim Shaikh
(74) *Attorney, Agent, or Firm* — Young Basile Hanlon & MacFarlane, P.C.

(57)　　ABSTRACT

Determining a speed plan for an autonomous vehicle (AV) is disclosed. Planned locations of the AV for future time steps are placed in an occupancy grid. The planned locations are based on a strategic speed plan that is determined without taking world objects into account. Predicted locations of the world objects for at least some of the future time steps are placed in the occupancy grid. Respective buffer distances corresponding to the predicted locations are added in the occupancy grid. An estimated speed plan is identified for the AV based on the occupancy grid. The speed plan is obtained from the estimated speed plan. The AV is then controlled according to the speed plan.

20 Claims, 14 Drawing Sheets

(56)                References Cited

U.S. PATENT DOCUMENTS

| | | | | |
|---|---|---|---|---|
| 2012/0053755 | A1* | 3/2012 | Takagi | G01S 7/4808 |
| | | | | 701/1 |
| 2016/0014564 | A1* | 1/2016 | Del Vecchio | H04W 4/023 |
| | | | | 455/456.2 |
| 2016/0297072 | A1* | 10/2016 | Williams | G05D 1/0234 |
| 2017/0270799 | A1* | 9/2017 | Takeda | B62D 15/02 |
| 2018/0240345 | A1* | 8/2018 | So | G08G 1/166 |
| 2019/0210610 | A1* | 7/2019 | Takeuchi | G08G 1/096716 |
| 2019/0369616 | A1* | 12/2019 | Ostafew | G08G 1/0112 |
| 2020/0377090 | A1* | 12/2020 | Seccamonte | B60W 60/0011 |
| 2021/0053561 | A1* | 2/2021 | Beller | G08G 1/166 |
| 2021/0086795 | A1* | 3/2021 | Zhao | G05D 1/0274 |
| 2022/0097736 | A1* | 3/2022 | Lin | B60W 60/0015 |
| 2022/0185294 | A1* | 6/2022 | Rakotovao Andriamahefa | |
| | | | | G05D 1/0274 |
| 2022/0212694 | A1* | 7/2022 | Varnhagen | B60W 60/0018 |
| 2022/0343241 | A1* | 10/2022 | Jha | G08G 1/166 |
| 2023/0012853 | A1 | 1/2023 | Tam et al. | |
| 2023/0110467 | A1* | 4/2023 | Jha | G08G 1/096791 |
| | | | | 701/24 |
| 2023/0206755 | A1* | 6/2023 | Jha | G08G 1/005 |
| | | | | 340/425.5 |
| 2023/0315112 | A1* | 10/2023 | Warshauer-Baker | |
| | | | | G05D 1/0221 |
| | | | | 701/23 |
| 2023/0347898 | A1* | 11/2023 | Terada | G16Y 40/30 |
| 2024/0190462 | A1* | 6/2024 | Schwindt | B60W 60/001 |
| 2025/0022365 | A1* | 1/2025 | Freienstein | B60W 30/0956 |

OTHER PUBLICATIONS

Commission Implementing Regulation; Official Journal of the European Union; Aug. 26, 2022; 64 pages.

* cited by examiner

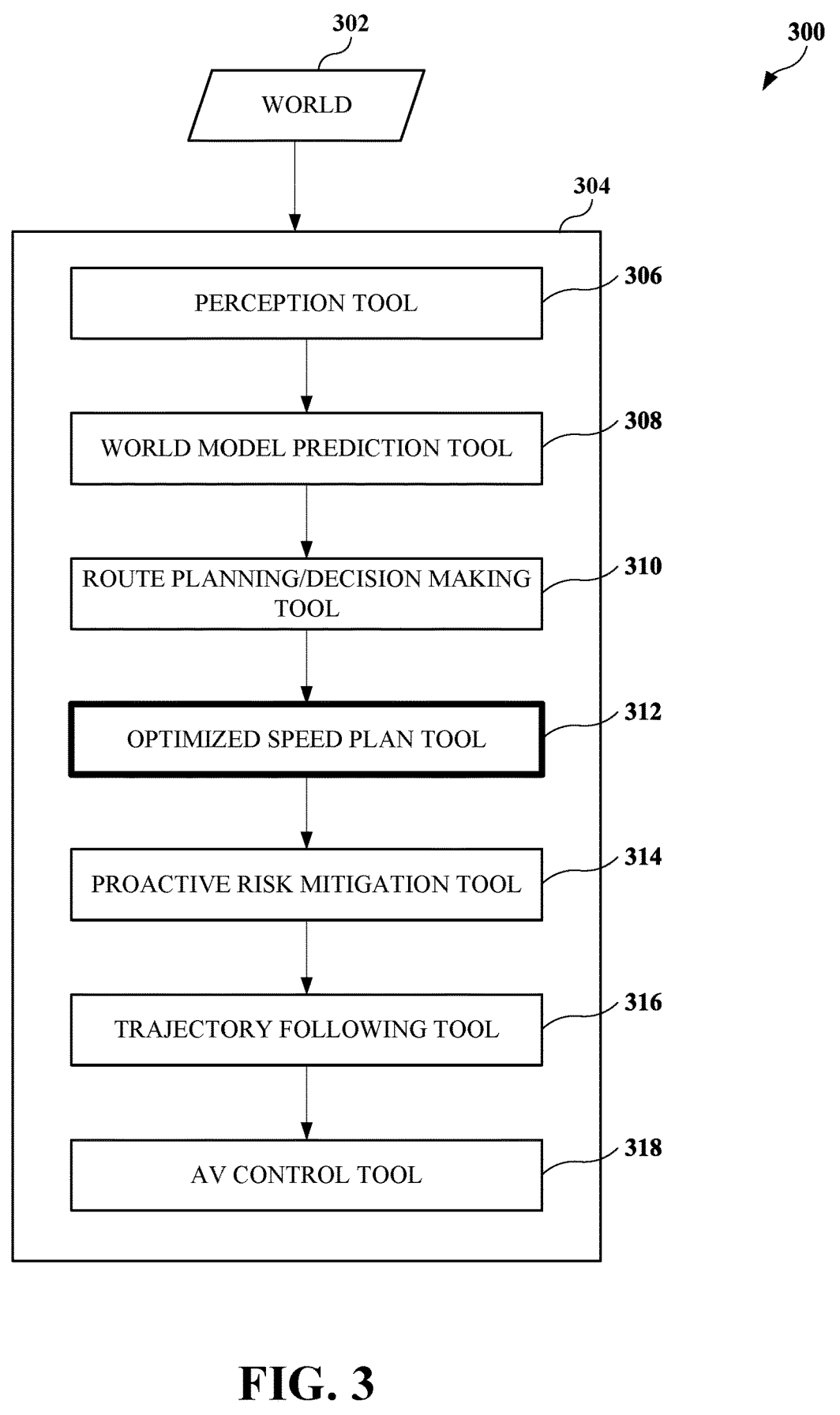

302

300

```
         ┌──────────────────┐
         │      WORLD       │
         └──────────────────┘
                  │
                  ▼
┌─────────────────────────────────────────┐ 304
│                                          │
│  ┌────────────────────────────────┐ 306  │
│  │        PERCEPTION TOOL         │      │
│  └────────────────────────────────┘      │
│                 │                         │
│                 ▼                         │
│  ┌────────────────────────────────┐ 308  │
│  │  WORLD MODEL PREDICTION TOOL   │      │
│  └────────────────────────────────┘      │
│                 │                         │
│                 ▼                         │
│  ┌────────────────────────────────┐ 310  │
│  │ ROUTE PLANNING/DECISION MAKING │      │
│  │             TOOL               │      │
│  └────────────────────────────────┘      │
│                 │                         │
│                 ▼                         │
│  ┌────────────────────────────────┐ 312  │
│  │    OPTIMIZED SPEED PLAN TOOL   │      │
│  └────────────────────────────────┘      │
│                 │                         │
│                 ▼                         │
│  ┌────────────────────────────────┐ 314  │
│  │  PROACTIVE RISK MITIGATION TOOL│      │
│  └────────────────────────────────┘      │
│                 │                         │
│                 ▼                         │
│  ┌────────────────────────────────┐ 316  │
│  │   TRAJECTORY FOLLOWING TOOL    │      │
│  └────────────────────────────────┘      │
│                 │                         │
│                 ▼                         │
│  ┌────────────────────────────────┐ 318  │
│  │        AV CONTROL TOOL         │      │
│  └────────────────────────────────┘      │
│                                          │
└──────────────────────────────────────────┘
```

FIG. 3

400
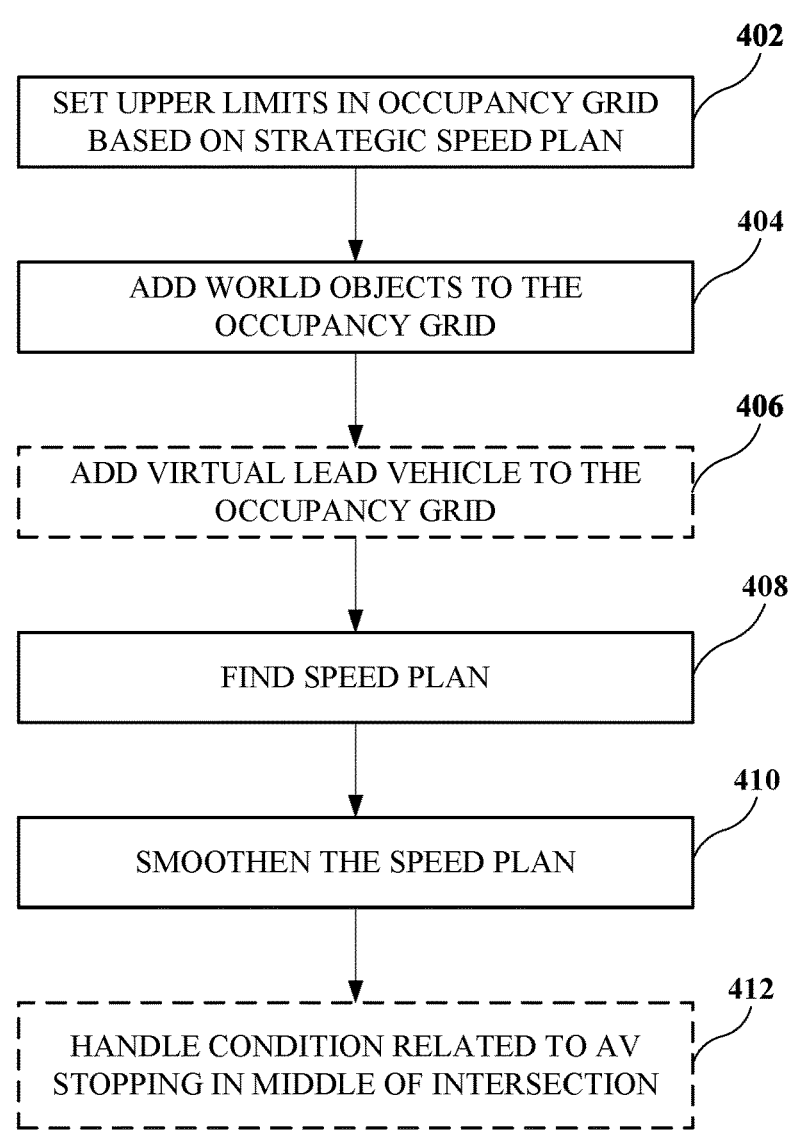
402
SET UPPER LIMITS IN OCCUPANCY GRID
BASED ON STRATEGIC SPEED PLAN
404
ADD WORLD OBJECTS TO THE
OCCUPANCY GRID
406
ADD VIRTUAL LEAD VEHICLE TO THE
OCCUPANCY GRID
408
FIND SPEED PLAN
410
SMOOTHEN THE SPEED PLAN
412
HANDLE CONDITION RELATED TO AV
STOPPING IN MIDDLE OF INTERSECTION
FIG. 4

600
602
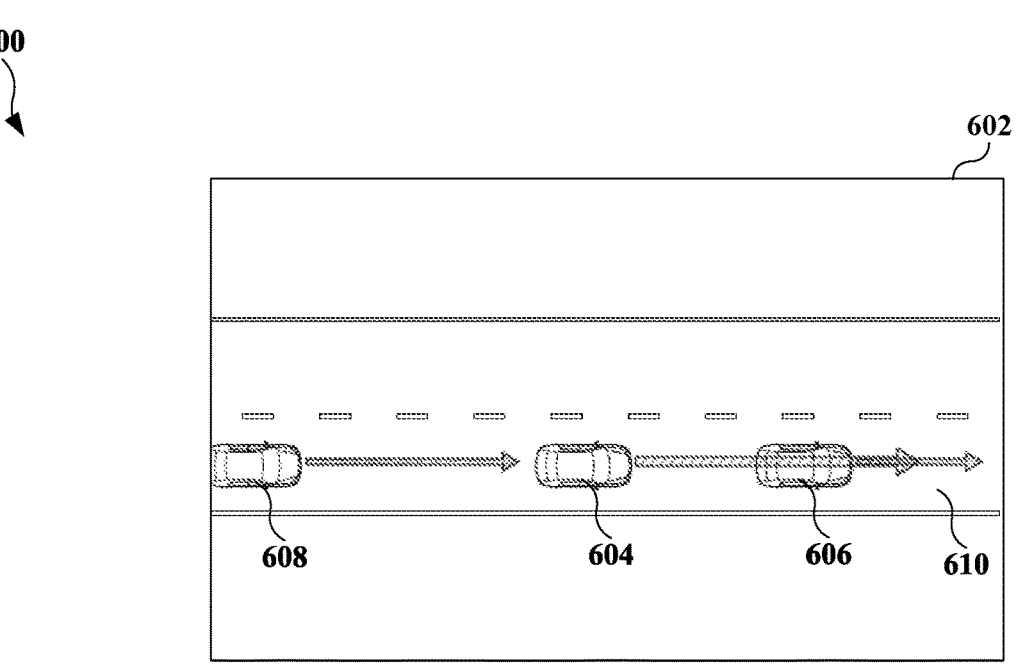
608          604          606          610
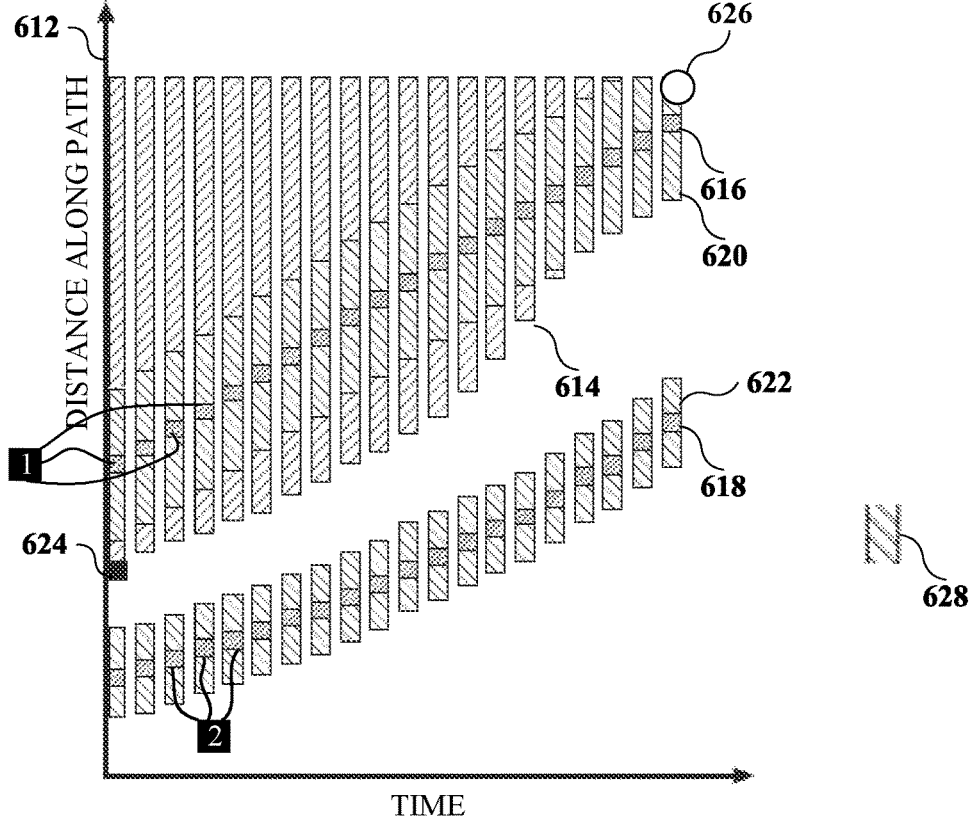
FIG. 6

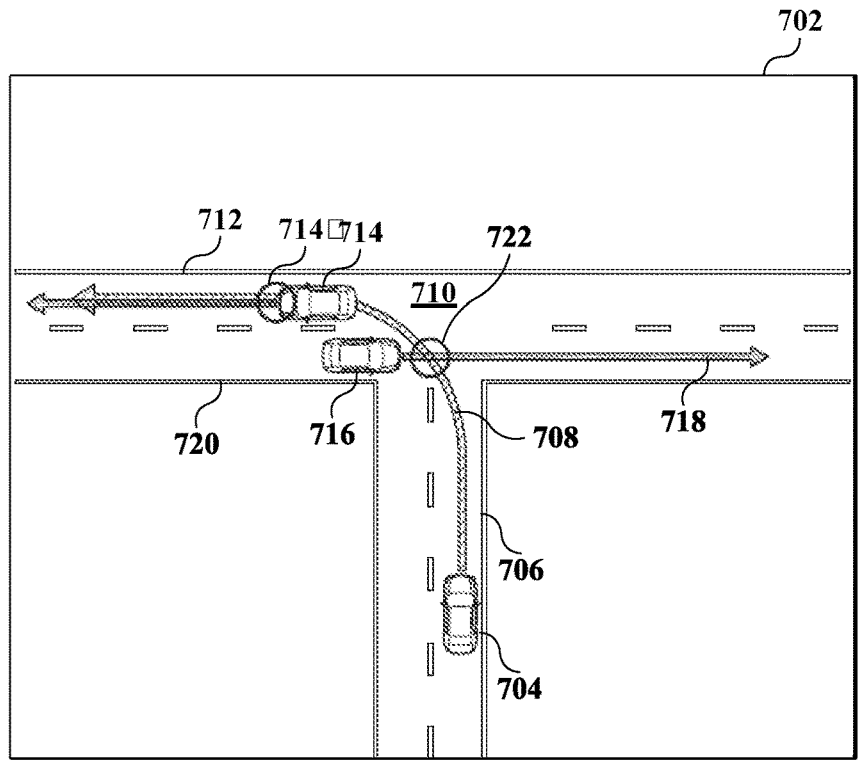
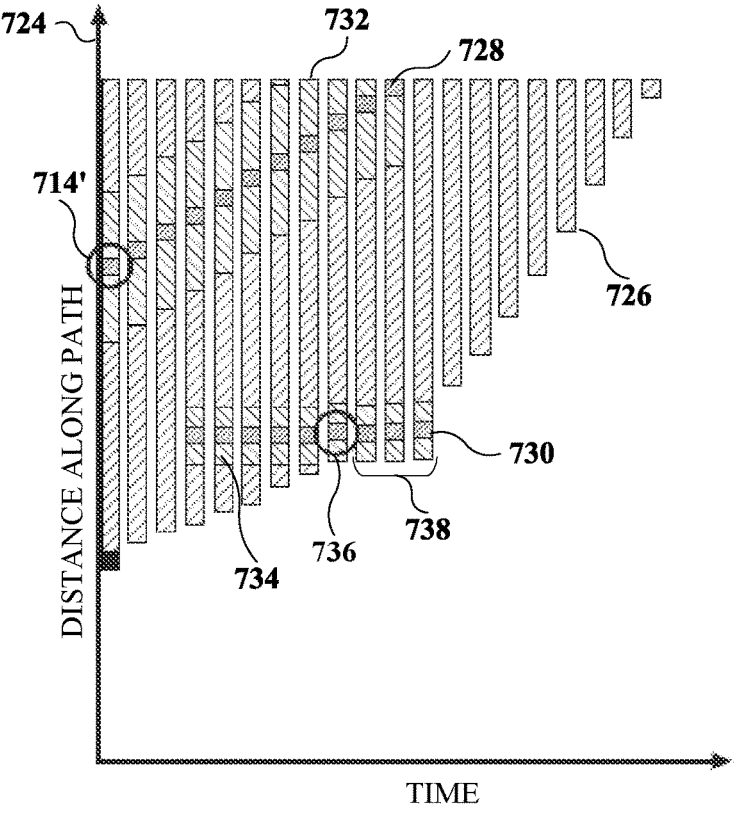
FIG. 7

800
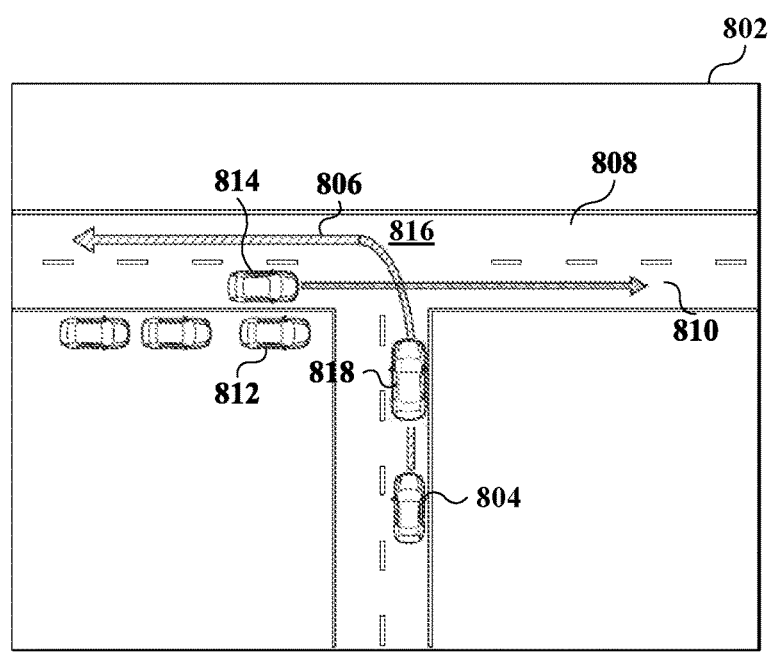
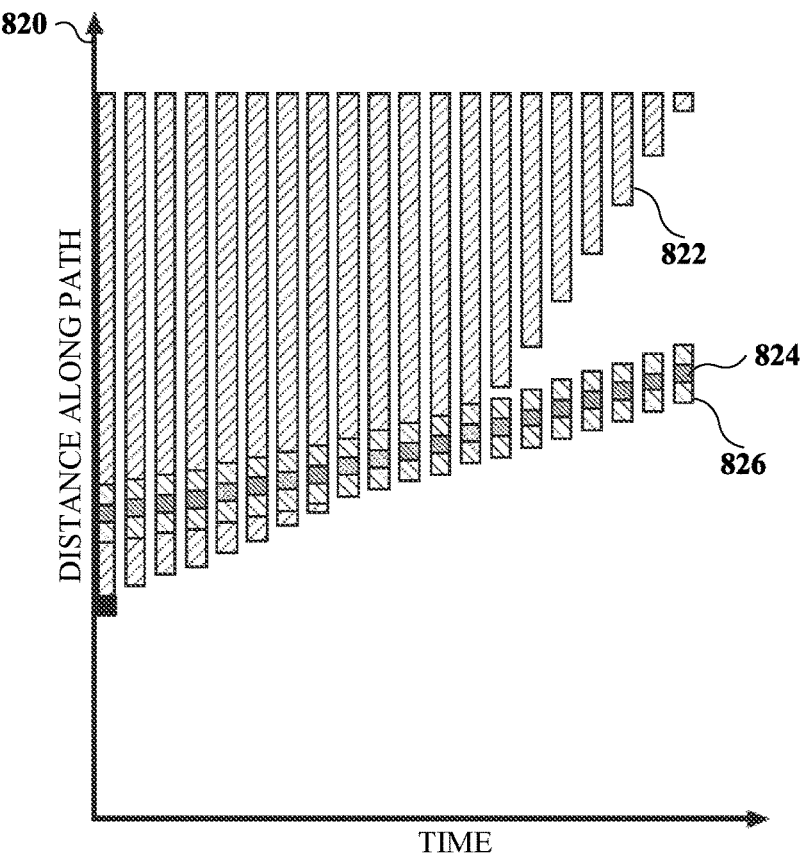
FIG. 8

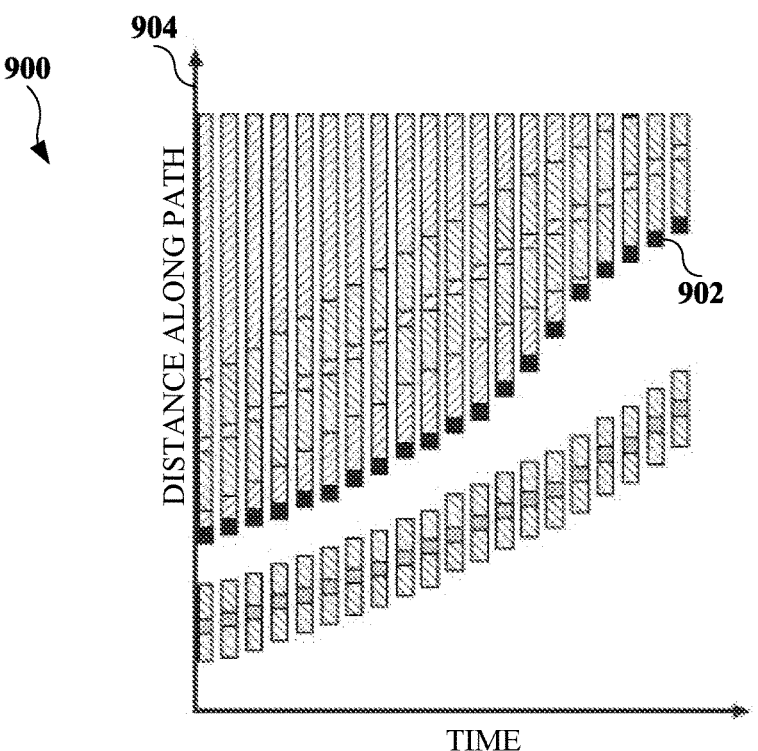
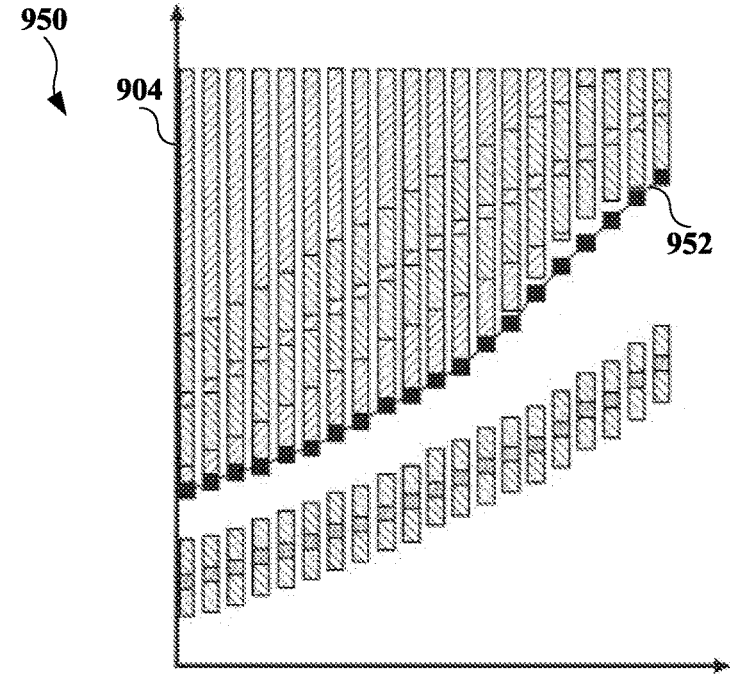
FIG. 9

1300

PLACE PLANNED LOCATIONS OF AN AV IN AN OCCUPANCY GRID — 1302

PLACE PREDICTED LOCATIONS OF WORLD OBJECTS IN THE OCCUPANCY GRID — 1304

ADD RESPECTIVE BUFFER DISTANCES CORRESPONDING TO THE PREDICTED LOCATIONS IN THE OCCUPANCY GRID — 1306

OBTAIN AN ESTIMATED SPEED PLAN FOR THE AV BASED ON THE OCCUPANCY GRID — 1308

OBTAIN A SPEED PLAN FROM THE ESTIMATED SPEED PLAN — 1310

CONTROL THE AV ACCORDING TO THE PATH — 1312

FIG. 13

CONSTRAINT-BASED SPEED PROFILE

CROSS REFERENCES TO RELATED APPLICATION(S)

This application is related to U.S. patent application Ser. No. 18/345,501, filed Jun. 30, 2023, the entire disclosure of which is incorporated herein by reference.

TECHNICAL FIELD

This application relates to autonomous driving and, more particularly, to using constraints to generate a speed profile for an autonomous vehicle.

BACKGROUND

Increasing autonomous vehicle usage creates the potential for more efficient movement of passengers and cargo through a transportation network. Moreover, the use of autonomous vehicles can result in improved vehicle safety and more effective communication between vehicles. However, external objects make traversing the transportation network autonomously difficult.

SUMMARY

A first aspect of the disclosed implementations is a method for determining a speed plan for an autonomous vehicle (AV). The method includes placing, for future time steps, planned locations of the AV in an occupancy grid, where the planned locations are based on a strategic speed plan that is determined without taking world objects into account; placing, for at least some of the future time steps, predicted locations of the world objects in the occupancy grid; adding respective buffer distances corresponding to the predicted locations in the occupancy grid; obtaining an estimated speed plan for the AV based on the occupancy grid; obtaining the speed plan from the estimated speed plan; and controlling the AV according to the speed plan.

A second aspect of the disclosed implementations is an AV that includes a memory and a processor. The processor is configured to execute instructions stored in the memory to determine a speed plan for the AV. The instructions include instructions to place, for future time steps, planned locations of the AV in an occupancy grid, where the planned locations are based on a strategic speed plan that is determined without taking world objects into account; place, for at least some of the future time steps, predicted locations of the world objects in the occupancy grid; add respective buffer distances corresponding to the predicted locations in the occupancy grid; obtain an estimated speed plan for the AV based on the occupancy grid; obtain the speed plan from the estimated speed plan; and control the AV according to the speed plan.

A third aspect of the disclosed implementations is a non-transitory computer readable medium storing instructions operable to cause one or more processors to perform operations for determining a speed plan for an autonomous vehicle (AV). The operations include placing, for future time steps, planned locations of the AV in an occupancy grid, where the planned locations are based on a strategic speed plan that is determined without taking world objects into account; placing, for at least some of the future time steps, predicted locations of the world objects in the occupancy grid; adding respective buffer distances corresponding to the predicted locations in the occupancy grid; obtaining an estimated speed plan for the AV based on the occupancy grid; obtaining the speed plan from the estimated speed plan; and controlling the AV according to the speed plan.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

FIG. 3 illustrates a system that includes an optimized speed plan tool (OSP) for constraint-based speed profile generation.

FIG. 4 is a process flow that illustrates the operations of the OSP tool of FIG. 3.

FIG. 6 illustrates an example of adding along world objects to an occupancy grid.

FIG. 7 illustrates another example of adding world objects to an occupancy grid.

FIG. 8 illustrates another example of adding a virtual lead vehicle to an occupancy grid.

FIG. 9 illustrates an example of a speed plan and an example of a smoothed speed plan.

FIG. 13 is a flowchart of an example of a technique for generating a speed profile of for an autonomous vehicle.

DETAILED DESCRIPTION

Figure 1:
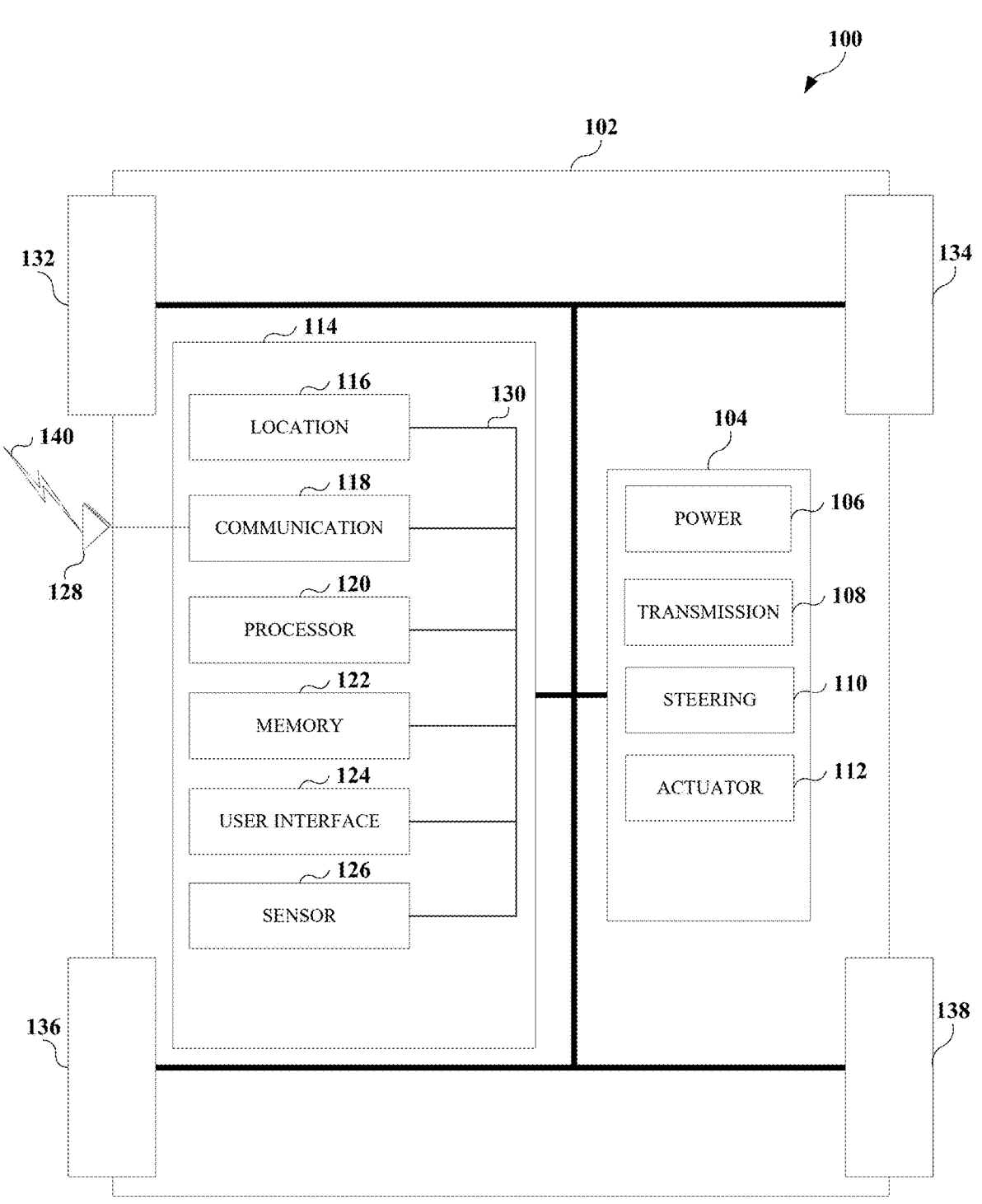
FIG. 1 is a diagram of an example of a portion of a vehicle in which the aspects, features, and elements disclosed herein may be implemented.

A self-driving vehicle, such as an autonomous vehicle (AV) or a semi-autonomous vehicle that includes an advanced driver-assistance system (ADAS), may traverse a portion of a vehicle transportation network using information derived from sensors. For simplicity of explanation, and unless otherwise indicated, both AVs and ADAS-enabled vehicles are both referred to as AVs.

An AV uses advanced sensors such as cameras, LiDAR, and radar to continuously scan monitor its scene (e.g., surrounding environment). Data from these sensors may be processed by onboard computers to create a detailed map of the scene. Combined with real-time traffic, GPS information, and map information, an optimal route is determined for the AV. Advanced control systems enable quick decisions on acceleration, braking, and steering, ensuring safe navigation in dynamic settings.

Constraint-based speed profile integrates the planned locations (e.g., positions) of an AV (e.g., a host vehicle), and the predicted (e.g., anticipated) locations of external world objects that might obstruct the planned route of the AV into an occupancy grid. The planned locations of the AV are obtained from (e.g., based on) a strategic speed plan, while the predicted positions of external objects may be derived from hypotheses that the AV maintains (e.g., via internal components, software, or modules therein) with respect to the world objects. In certain scenarios, virtual world objects may also be added to the occupancy grid.

A search algorithm then estimates a tactical speed plan (also referred to herein as a modified speed plan, detailed-planned trajectory, a short-term speed plan, or tactical speed plan), adjusting the initial strategic speed plan based on the world objects in the scene. The occupancy grid can be used to set constraints for a constraint-based optimization problem to solve for an optimal speed plan relative to the objects in the occupancy grid. Constraint-based speed profile can be calculated (e.g., obtained) at regular intervals (e.g., at every time step), ensuring that speed plan is constantly refined in response to the evolving scene, guaranteeing safe operation of the AV. To be clear, an estimated speed plan is obtained using the search algorithm; and then the speed plan is then obtained from the estimated speed plan using by solving an optimization problem. To be even clearer, while the output of the search algorithm is referred to as an estimated speed plan," the output is not technically a speed plan; rather, it is an estimate of the distance along the path the AV will travel over the time, relative to the occupied space in the occupancy grid. The estimated speed plan does not include any velocity or acceleration data—it only includes distance values at discrete time steps.

A "speed plan," as used herein, can be a dataset that associates a vehicle speed with specific longitudinal positions or travel times during autonomous driving. The speed plan dictates the desired speed or other motion parameters (e.g., acceleration or jerk) for the vehicle at various points or moments on its (planned) route, ensuring the vehicle adheres to these targets as it navigates autonomously. Thus, the speed plan can include speeds and positions. Determining a speed plan can include identifying associated speeds (or motion parameters) for portions of a path identified by a route planner. The portions of the path are those corresponding to a planning window, as described herein. A "strategic" speed plan is a speed plan that is planned without taking into account other identified world objects. A "tactical" (or "modified") speed plan modifies the strategic plan based on the world objects in the scene.

To describe some implementations of the teachings herein in greater detail, reference is first made to the environment in which this disclosure may be implemented. FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals, power, such as electrical power or torque, or both information and power, may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

Figure 2:
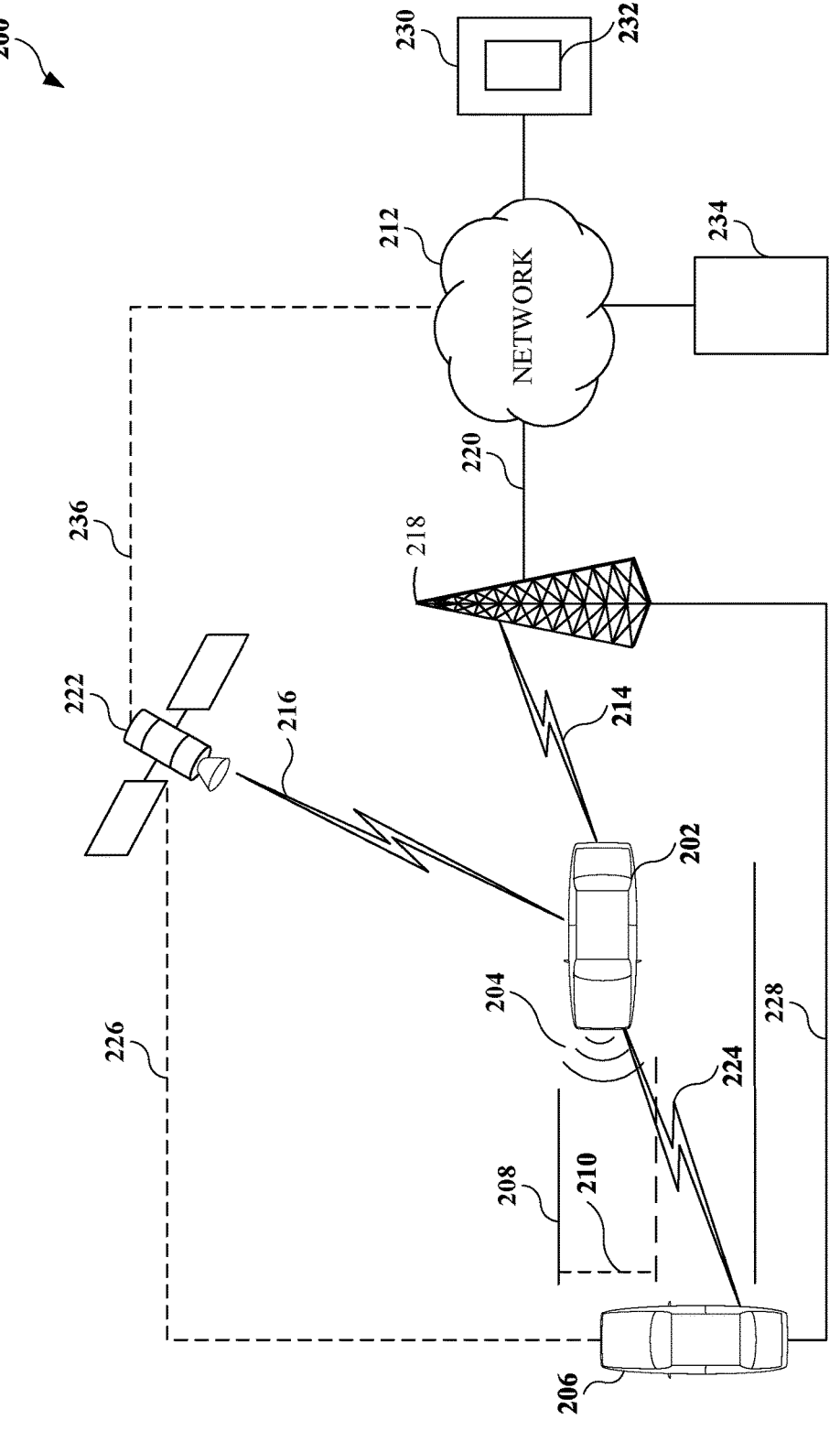
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors

204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Regardless of the sensor source, each vehicle traveling in the vehicle transportation network determines its (e.g., optimal) operation based on the sensed data. Collective action based on the sensed data as described herein can improve the operation of multiple vehicles and can also improve the operation of the vehicle transportation system itself.

FIG. 3 illustrates a system that includes an optimized speed plan tool (OSP) for constraint-based speed profile generation. The system 300 includes a world 302 and an AV 304. The world 302 can be as described with respect to the transportation and communication system 200 of FIG. 2. As such, the world 302 can include other world objects that are traversing roads that may be included or described in a map (e.g., a high-definition (HD) map) included in or accessible by the AV 304. The AV 304 can be the vehicle 100 of FIG. 1 or the vehicle 202 of FIG. 2.

The AV 304 includes a set of tools that may collectively to be referred to as the AV software stack. The AV software stack encompasses a set of algorithms that seamlessly collaborate to enable various aspects of the autonomous operations of the AV 304. The software stack may orchestrate sensor data fusion, perception, decision-making, and control to safely navigate and interact with the world 302.

The AV 304 (i.e., the AV software stack therein or associated therewith) is shown as including a perception tool 306, a world model prediction tool 308, a route planning/ decision making tool 310, an OSP tool 312, a proactive risk mitigation tool 314, a trajectory following tool 316, and an AV control tool 318. The disclosure herein is mainly focused on the functional aspects, operations, and capabilities of the OSP tool 312.

At least some of the tools can be implemented as respective software programs that may be executed by one or more processors, such as the processor 120 of FIG. 1. A software program can include machine-readable instructions that may be stored in a memory such as the memory 122 of FIG. 1, and that, when executed by a processor, such as the processor 120, may cause the performance of the instructions of the software program. In some implementations, more or fewer tools may be included in the AV software stack. Some of the tools or aspects thereof may be implemented directly in hardware, firmware, software executed by hardware, circuitry, or a combination thereof.

The perception tool 306 includes sensors and obtains sensor data from the world 302. For example, the perception tool may obtain images of the world 302, points clouds corresponding to objects in the world 302, and so on. The world model prediction tool 308 receives the sensor data and determines (e.g., converts to, detects, etc.) world objects from the sensor data. That is, for example, the world model prediction tool 308 determines the world objects from the received sensor data. For example, the world model prediction tool 308 can convert a point cloud received from a light detection and ranging (LiDAR) sensor (i.e., a sensor of the sensor 126) into a world object. Sensor data from several sensors can be fused together to determine (e.g., guess the identity of, classify, etc.) the world objects. Examples of world objects include a bicycle, a pedestrian, and a vehicle.

The world model prediction tool 308 can receive sensor information that allows the world model prediction tool 308 to obtain (e.g., determine, calculate, identify, select, etc.) and maintain additional information for at least some of the detected world objects. For example, the world model prediction tool 308 can maintain respective states for at least some of the determined world objects. For example, the state associated with a world object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model prediction tool 308 fuses sensor information, tracks world objects, maintains lists of hypotheses for at least some of the dynamic objects (e.g., an object A might be going straight, turning right, or turning left), creates and maintains predicted trajectories for each hypothesis, and maintains likelihood estimates of each hypothesis (e.g., object A is going straight with probability of 90% considering the object pose/velocity and the trajectory poses/velocities).

The route planning/decision making tool 310 determines a road-level plan. For example, given a starting location and a destination location, the route planning/decision making tool 310 determines a route from the starting location to the destination location. The route planning/decision making tool 310 can determine the list of roads (i.e., the road-level plan) to be followed by the AV to navigate from the starting location to the destination location.

The route planning/decision making tool 310 determines (e.g., identifies) decisions along the road-level plan. High level descriptive examples of discrete-level decisions may include: stop at the interaction between road A and road B, move forward slowly, accelerate to a certain speed limit and then merge onto the rightmost lane, prepare to stop because a stop light may be turning red, etc. The decisions may be based on data included in the map. For example, the map may indicate the presence of a traffic light or that a lane merges onto another and so on. The output of the route planning/decision making tool 310 may be referred to as a strategic speed plan. As mentioned above, the speed plan is "strategic" because it is planned without taking into account the other identified world objects. While FIG. 3 illustrates that route planning/decision making tool 310 may follow the world model prediction tool 308, that need not be the case.

The OSP tool 312, which is further described herein, modifies the strategic speed plan based on world objects that may interfere with the path (e.g., with the strategic speed plan) of the AV 304 based on an occupancy grid. The OSP tool 312 can be said to plan for a current scenario (e.g., world objects observed in the scene at a current time step to) as well as how the scenario will develop at future time steps ($t_n$, where n=1, . . . , N) within a planning horizon (e.g., 6 seconds into the future or any other number of seconds). The planning horizon can be divided into a pre-defined number of time steps N. The OSP tool 312 accounts for multiple world objects interacting with the AV 304. That is, the OSP tool 312 can handle multiple constraints related to multiple respective world objects at once (e.g., simultaneously). While certain scenarios (e.g., edging for unprotected turns at intersections and crossing intersections) are described herein with respect to the OSP tool 312, as a person skilled in the art can appreciate, the teachings herein can be easily extended or adapted to other scenarios encountered by the AV 304, such as fitting into gaps during merges or other road scenarios.

Whereas the route planning/decision making tool 310 generates a strategic speed plan, the OSP tool 312 may modify the strategic speed plan (more accurately, the portion of the strategic speed plan corresponding to the planning window, also referred to as a time horizon) to obtain a tactical speed plan (or a detailed-planned trajectory). The OSP tool 312 can receive the discrete-level decisions of the strategic speed plan, the world objects (and corresponding state information), and the predicted trajectories and likelihoods of the external objects. The OSP tool 312 can use at least some of the received information to determine the detailed-planned trajectory (e.g., the tactical speed plan) for the AV 304.

The OSP tool 312 can be summarized as performing the steps of: filling out (e.g., generating, constructing, updating, etc.) an occupancy grid, performing a search algorithm (e.g., A*) to identify an estimated path, smoothing the estimated path, adding stop conditions (such as described below with respect to stop lines), formulating constraints, and then solving an optimization problem based on the constraints. The solution to the optimization problem is the short-term or tactical speed plan.

The proactive risk mitigation tool 314 may further adjust the tactical speed plan to account for potential hazards. A potential hazard is one that is not currently determined to interfere with the path of the AV 304 but which might in the future. To illustrate, a vehicle may be parked at a side of a street. The driver's door is currently closed. As such, the door does not currently interfere with the path of the AV 304. However, the door may open in the future and may cause the AV to perform an emergency maneuver to avoid the door.

The proactive risk mitigation tool 314 considers the reactive capabilities of the AV 304 in planning a proactive trajectory for the vehicle that minimizes speed and/or lateral changes in movement responsive to a potential hazard while still allowing for a comfortable and safe reactive response (i.e., a reactive trajectory) in the event a hazard object interferes with the path of the vehicle. A proactive trajectory for the AV 304 may be determined that adjusts the planned path and speed proactively for collision avoidance if the hazard object materializes as predicted. The proactive trajectory is such that if the hazard materializes, the AV 304 would not have to make an emergency, evading maneuver that would be uncomfortable for occupants of the AV 304. Again, with respect to the door scenario, the AV 304 may be moved just enough to the left.

The trajectory following tool 316 produces control signals (e.g., steering, acceleration, etc.) to cause the AV 304 to be controlled according to the output of the route planning/decision making tool 310. The route planning/decision making tool 310 may operate at a first frequency (e.g., 10 Hertz) and the trajectory following tool 316 may operate at a second, different, frequency (e.g., 100 Hertz). The AV control tool 381 may output control signals to control actuators of the AV 304 so that the AV 304 is controlled according to the speed plan.

FIG. 4 is a process flow 400 that illustrates the operations of the OSP tool 312 of FIG. 3. The OSP tool 312 constructs an occupancy grid that includes an AV and other world objects. Constraints are associated with the other world objects. A search algorithm is used to find a path (e.g., a tactical speed plan) for the AV based on the occupancy grid. In an example, an A* (pronounced A-star) search algorithm is used. However, other search algorithms are possible.

For ease of understanding, visual representations of occupancy grids are shown and described herein. However, any suitable data structure maintainable in a memory, such as the memory 122 of FIG. 1, and usable by the search algorithm can be used. An occupancy grid can be thought of as a tool to visualize and store constraints relative to distance and time as the AV travels along its path. The occupancy grid essentially stores constraints (further described herein) that are relevant to the path of the AV. The process flow 400 is further described with reference to FIGS. 6-12.

At 402, upper limits are set in (e.g., added to) the occupancy grid based on the strategic speed plan. Upper limits set the possible distances that the AV could be based on its predicted future locations based on the strategic speed plan.

Figure 5:
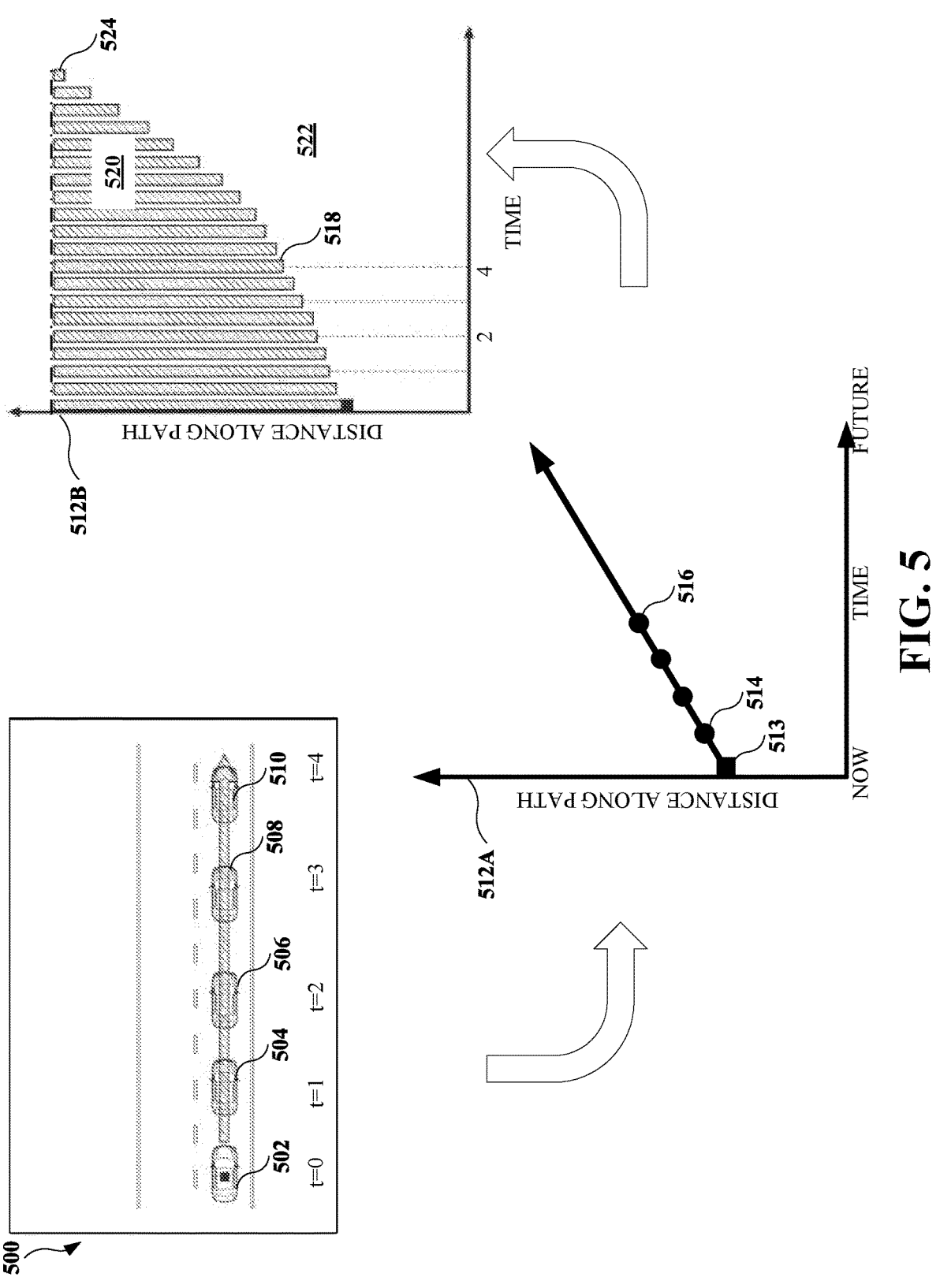
FIG. 5 illustrates an example of setting upper limits in the occupancy grid.

FIG. 5 illustrates an example 500 of setting upper limits in the occupancy grid. The locations of an AV 502 within the planning window (e.g., time horizon) and according the strategic speed plan are identified. The example 500 illustrates that the AV 502 is planned to be at locations 504, 506, 508, 510, etc. at time steps t=1, t=2, t=3, t=4, etc., respectively. The planned locations are placed in an occupancy grid 512A. The occupancy grid 512A is a two-dimensional graph where the x-axis represents time and the y-axis represents distance along the path of the AV 502 from a current location 513 (e.g., the location at time step t=0) of the AV 502. More specifically, the y-axis can indicate distance traveled by the AV 502 from one step to the immediately succeeding time step. The occupancy grid illustrates that points 514 and 516 of an occupancy grid 512A correspond to the locations 504 and 510, respectively.

While the locations may visually appear to be equally spaced in FIG. 5, that may not necessarily be case as the strategic speed plan is generated relative to (e.g., based on) road speed limits and road curvatures. Additionally, the road speed limits and road curvatures act as (e.g., are used to set) the upper limit of how fast the AV 502 can drive with no other road users present. An occupancy grid 512B shows that the occupancy grid 512A has been updated to include the upper limits.

Each of the vertical bars, such as a vertical bar 518, indicates possible locations of the AV 502 at the corresponding time step. For example, the vertical bar 518 illustrates the possible locations of the AV 502 at t=4. An area 520 illustrates possible positions of the AV 502 if the AV 502 were to be moving faster than the speed indicated by the strategic speed plan. An area 522 indicates would include positions of the AV 502 if the AV 502 were to be moving slower than the speed indicated by the strategic speed plan. The occupancy grid 512B includes vertical bars (upper limits) corresponding the time steps of the planning window. As such, a vertical bar 524 corresponds to the last time step in the current planning window.

Referring again to FIG. 4, at 404, some of the world objects are added to the occupancy grid. More specifically, world objects whose paths are predicted to interact with that of the AV are added to the occupancy grid. Adding a world object to the occupancy grid includes adding the predicted locations of the world object to the occupancy grid. Distances that are based on the predicted paths of the respective world objects are added to the occupancy grid. Buffer distances are also added to the occupancy grid. The distances and the buffer distances are based on whether the world object is classified as an along path world object or a crossing world object. An along path world object is one that is traveling in the same direction as the AV and the AV and world object are currently or will be in the same road lane. A crossing world object is one whose path crosses (e.g., intersects) that of the AV.

FIG. 6 illustrates an example 600 of adding along world objects to an occupancy grid. A scene 602 illustrates that an AV 604, a leading vehicle 606 (e.g., a vehicle that is ahead of the AV 604), and a trailing vehicle 608 (e.g., a vehicle that is behind the AV 604) are traveling in the same direction along a lane 610. As such, both of the leading vehicle 606 and the trailing vehicle 608 are classified as along world objects. An occupancy grid 612 has been generated and includes upper limits, as described above. As such, a vertical bar 614 can be similar to the vertical bar 518 of FIG. 5.

Predicted locations of each of the leading vehicle 606 and the trailing vehicle 608 are added to the occupancy grid 612. Locations labeled (1), such as a location 616, correspond to the predicted locations of the leading vehicle 606; and locations labeled (2), such a location 618, correspond to the predicted locations of the trailing vehicle 608. A respective buffer distance is then added with respect to each of the predicted locations. The calculations of the buffer distances is further described below. The buffer distances are considered to be constraints on the locations of the AV as the tactical speed plan is searched for. Said another way, the buffer distances can be considered to correspond to prohibited locations of the AV when the tactical speed plan is searched for. To illustrate, a buffer distance 620 is added corresponding to the location 616; and a buffer distance 622 is added corresponding to the location 618. In all of the FIGS., buffer distances are those filled with a pattern 628. Buffer distances are shown as being in front of and behind world objects added to the occupancy grid. The buffer distance ahead of a leading vehicle can be used in cases where a vehicle may be merging into the AV lane (such as in the case where the AV may be making a left turn at an unprotected intersection). In such cases, the buffer distance can be used to determine whether there is enough distance for the AV to be (e.g., to fit) ahead of the merging vehicle.

Figure 11A:
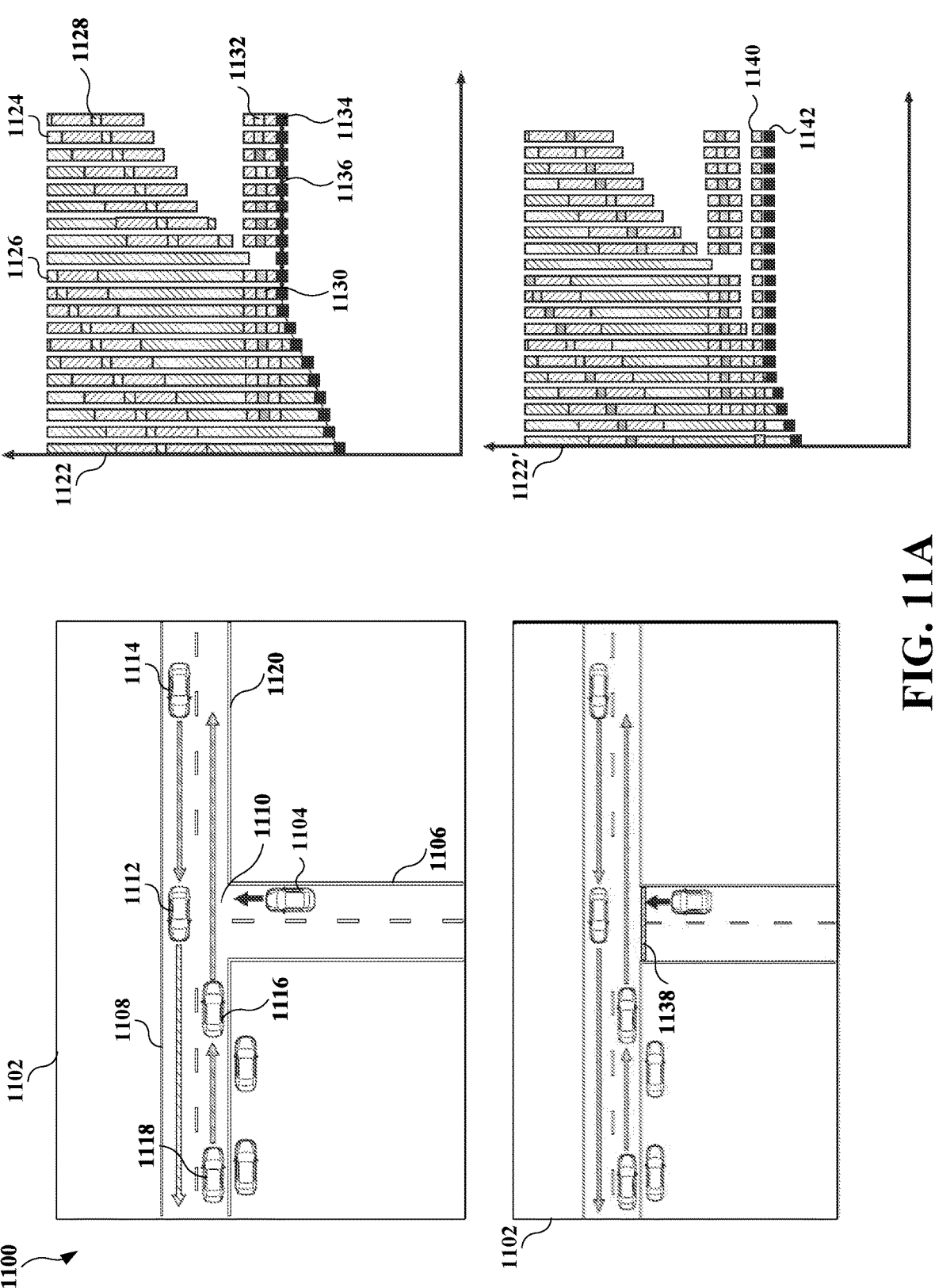
FIGS. 11A-11B illustrate an example 1100 of identifying speed plans based on occupancy grids.

This scenario, while not specifically described as such, is illustrated with respect to FIG. 11A where the AV 1104 will merge in front of the second along path vehicle 1114.

FIG. 7 illustrates another example 700 of adding world objects to an occupancy grid. A scene 702 illustrates that an AV 704 is traveling on a lane 706 along a planned path 708 (i.e., according to a strategic speed plan) towards a T-intersection 710 where the AV 704 is planned to turn left heading westward on a lane 712. The scene 702 also includes an along path vehicle 714 that is also predicted to be traveling on the lane 712. The along path vehicle 714 is initially observed to be at a location 714'. The scene 702 also includes a crossing vehicle 716. The crossing vehicle 716 is predicted to be traveling eastward along a path 718 on a lane 720. The paths of the AV 704 and the crossing vehicle 716 are predicted to intersect at a location 722.

An occupancy grid 724 has been generated and includes upper limits, as described above. As such, a vertical bar 726 can be similar to the vertical bar 518 of FIG. 5. Predicted locations (such as a location 728) of the along path vehicle 714 are added to the occupancy grid 724; and locations (such as a location 730) of the crossing vehicle 716 are added to the occupancy grid 724. The locations of the crossing vehicle 716 are not based on a predicted path, over time, of the crossing vehicle 716. Rather, and as can be observed in the occupancy grid 724, the crossing vehicle 716 appears to be stationary over time. As the crossing vehicle 716 briefly crosses the path of the AV 704, the locations are time-based (as opposed to being distance based as for along world objects). The location of the crossing vehicle 716 is the location of intersection (the location 722).

Buffer distances, such as buffer distances 732 and 734, are then added with respect to the locations. In the occupancy grid 724, a location 736 corresponds to the location 722 (i.e., the intersection). The occupancy grid can include additional (e.g., extra) buffer times 738 for after the crossing vehicle 716 passes the AV 704 as an additional safety measure, just in case the crossing vehicle 716, for example, stalls.

Buffer distances for along path world objects are set (e.g., calculated, configured, selected, etc.) based on time headway (THW), such as using equation (1); and buffer distances for crossing world objects are set based time-to-collision (TTC), such as using equation (2).

$$THW = \min(1.6 - (vel - 14) * 0.033, 1.3) \tag{1}$$

$$TTC = \frac{v_{xing}}{6} + 1.5 \tag{2}$$

In equation (1), vel is the velocity of the AV 704, 1.3 seconds and 1.6 seconds indicate, respectively, the minimum time headway and the maximum time headway; and 14 represents a speed of 14 meters per second. Equation (1) is essentially a linear equation that can interpreted relative to the velocity vel of the AV 704. The faster the AV 704 is traveling, the AV 704 will eventually reach 1.3 seconds for the THW; and the slower the AV 704 is traveling, the AV 704 will stay at 1.6 seconds for the THW. Equation (1) (i.e., the values 1.6, 1.3, 14, and 0.033 used therein) is empirically derived and has been found to result in a comfortable result (e.g., ride) during testing. As is known, THW is the time interval between two vehicles passing a specific point on a roadway, typically measured from the front of one vehicle to the front of the following vehicle.

In equation (2), $v_{xing}$ is the observed speed the crossing vehicle. Equation (2) sets out a minimum required time that is comfortable for the crossing vehicle 716 to allow the AV 704 to pass it or for the AV 704 to wait for the crossing vehicle 716 to pass the AV 704 first, specifically at intersections.

Referring again to FIG. 4, at 406, a virtual lead vehicle is added to the occupancy grid, if necessary (e.g., based on blocked visibility). When virtual predictions (i.e., predicted path or locations of a virtual world object) intersect with the path of the AV, special "virtual" lead vehicles are created (e.g., added to the occupancy grid) to produce an edging effect, causing the AV to slowly inch through the beginning of an intersection for more visibility. This "virtual" lead vehicle disappears (e.g., is removed from the occupancy grid) when visibility becomes possible.

To illustrate, if the AV is turning left at an intersection and the lane onto which the AV is planned to turn is occluded, then a virtual crossing vehicle may be placed close to (e.g., at) a last location on the lane that is observable by sensors of the AV along its path. As further described herein, a virtual lead vehicle is added to the occupancy grid to induce (e.g., cause or generate) an edging motion by the AV towards the intersection. More generally, other types of virtual vehicles can be added, as necessary, depending on the road geometry.

A virtual vehicle is one that does not in fact exist in the scene (e.g., the world 302 of FIG. 3) and is not one that is perceived by the perception tool 306 of FIG. 3. Virtual vehicles may be added to the world model maintained by the world model prediction tool 308 of FIG. 3 in cases where portions of a road are occluded, such as when driving around tight corners and/or driving in limited visibility environments (e.g., on a foggy day or a lane is not completely visible) or in anticipation of vehicles unexpectedly appearing. Virtual vehicles are added to the world model in occluded regions of a road (e.g., a lane therein) or at a maximum perception range. The edging motion allows the AV to slowly gain more visibility of the scene while maintaining the ability to stop for real vehicles that may appear and are not currently perceptible by sensors on the AV. The edging motion contributes to the process of crossing unprotected intersections with limited visibility.

FIG. 8 illustrates another example 800 of adding a virtual lead vehicle to an occupancy grid. A scene 802 illustrates that an AV 804 is traveling along a planned path 806 towards a T-intersection 816 where the AV 804 is planned (based on the strategic speed plan) to turn left into a first traffic lane 808 that extends in an westward direction. The scene 802 illustrates that a portion of an opposite traffic lane 810 is occluded by, for example, parked vehicles, such as an obstruction 812. The scene 802 illustrates that a vehicle 814 may possibly be on the opposite traffic lane 810 but is not perceptible by the sensors of the AV 804 because of the obstruction 812. As such, the AV 804 is to be controlled to move cautiously towards and enter the T-intersection 816. In such a scenario, a virtual lead vehicle 818 is added to an occupancy grid 820.

The occupancy grid 820 has been generated and includes upper limits, as described above. As such, a vertical bar 822 can be similar to the vertical bar 518 of FIG. 5. The virtual lead vehicle 818 is treated as an along path world object and predicted locations therefor, such as a location 824, are added to the occupancy grid 820 along with buffer distances, such as a buffer distance 826.

Whereas the buffer distances for real (e.g., observed or sensed) along path world objects are calculated as described above with respect to equation (1), the THW with respect to a virtual lead vehicle can be set to a small constant (e.g., 0.5 seconds) so that a close following distance can be maintained. The virtual lead vehicle 818 is configured to be at an offset ahead of the AV 804 and have a non zero speed at all times. As such, the virtual lead vehicle 818 can only slow down the AV 804 without bringing it to a complete stop. As further described below, the AV 804 may be stopped if other factors (e.g., a stop line) is added to the occupancy grid. The AV 804 may also be stopped when/if other world objects are observed and added to the occupancy grid as the scene 802 evolves.

Referring again to FIG. 4, at 408, an estimated speed plan (e.g., a short-term or tactical speed plan) for the planning window is determined (e.g., searched, calculated, identified, etc.) based on the occupancy grid. That is, after all relevant world objects are included into the occupancy grid, a search algorithm (e.g., the A* search algorithm) searches for the estimated, quickest path from a current AV position (e.g., a start position, such as a current position 624 of FIG. 6) to the upper right-hand corner (e.g., a goal position, such as a position 626 of FIG. 6) representing the farthest distance in the planning window. The result of A* is an estimated speed plan that is then used to formulate constraints in the optimization problem that generates the real speed plan (e.g., the short-term speed plan) used. As already mentioned, the estimated speed plan is in fact a set of distance values at discrete time steps.

A conventional occupancy grid breaks a space down into cells represented in the occupancy grid based on their x and y coordinates; and a conventional A* search is performed in this two-dimensional space based of which cells are occupied or are otherwise unavailable. However, the occupancy grid described herein includes time on the horizontal axis and distance on the vertical axis. The occupancy grids described herein convey information such as: at 50 meters along the path of the AV and 3 seconds from now, that location will be occupied and the AV cannot be allowed to be at that location. The A* search algorithm can be thought of as a variant of the conventional A* search and uses a heuristic that follows the strategic plan as closely as possible to estimate distances along the path of the AV vs. time. For example, the strategic speed plan, world model objects and their relative time headways all represent occupied spaces in the occupancy grid. The occupancy grid indicates to the A* search algorithm the spaces that the AV cannot occupy. To further clarify, everything plotted on the occupancy grid at this point (e.g., strategic speed plan, world objects, THWs) represent an occupied space. To perform the search, at least the following operations are performed: lead vehicles are identified, the strategic speed plan is obtained and the occupancy grid is generated.

Referring again to FIG. 4, at 410, the estimated short-term speed plan may be smoothed. A path smoothing interpolation algorithm can be applied to the estimated predicted values of the AV therewith resulting in a more realistic (and smoother) speed plan. FIG. 9 illustrates an example 900 of an estimated speed plan and an example 950 of a smoothed estimated speed plan (i.e., a smoothed path). The estimated speed plan illustrated in the example, 900 is obtained at 408 and includes a set of locations (shown as black-filled squares), such as a location 902, shown on an occupancy grid 904. A smoothed estimated speed plan (i.e., a smooth curve 952) illustrates the results of the smoothing of the estimated speed plan (or, simply, smoothed speed plan). Again, the estimated (or smoothed) speed plan consists of distance values at discrete time steps.

At 412 of FIG. 4, the OSP checks whether the smoothed speed plan results in the AV having to be stopped inside (e.g., in the middle) of an intersection at any point in time within the planning window. If not, then the AV is controlled to proceed according to the speed plan (i.e., the smoothed speed plan). On the other hand, if the AV is planned to be stopped in the middle of an intersection, then a virtual stop line is created at the beginning of the intersection preventing the AV from entering until a clear path from the start to end of the intersection is detected (e.g., identified, calculated, planned, etc.). The beginning and the ending of an intersection can be identified based on (e.g., obtained from) a map (e.g., a high-definition map).

Figure 10:
FIG. 10 illustrates an example of a stop line when an AV is planned to stop inside of an intersection.

FIG. 10 illustrates an example 1000 of a stop line when an AV is planned to stop inside of an intersection. A scene 1002 illustrates that an AV 1004 is planned to travel along a path 1006 (e.g., a smooth speed plan), through an intersection 1007, westward onto a lane 1008 that includes an along lead vehicle 1010. The scene 1002 also includes a crossing vehicle 1012 that is traveling eastward on a lane 1014. An occupancy grid 1016 has been constructed to include predicted locations (such as a location 1018) of the along lead vehicle 1010 and predicted locations (such as a location 1020) of the crossing vehicle 1012. The occupancy grid 1016 also illustrates that a smoothed speed plan 1022 has been identified for the AV 1004 and that, as indicated by the group of locations 1024, the AV 1004 is planned to be static for a period of time (e.g., more than 1 second) inside the intersection while awaiting the crossing lead vehicle 1012 to pass so that the AV 1004 can proceed behind it. The occupancy grid 1016 also includes lines 1026 and 1028 demarcating the start and the end of the intersection 1007, as identified based on a map.

As such, a virtual stop line 1030 is created at the beginning of the intersection therewith preventing the AV from entering the intersection 1007 until a clear path from the start to end of the intersection can be identified. The OSP tool 312 updates the occupancy grid 1016 to obtain an occupancy grid 1016′ adding static locations, such as a location 1032, that reflect the placement of the virtual stop line 1030. Accordingly, a new smoothed speed plan 1034 can be obtained (e.g., searched or recalculated) based on the updated occupancy grid.

Figure 11B:
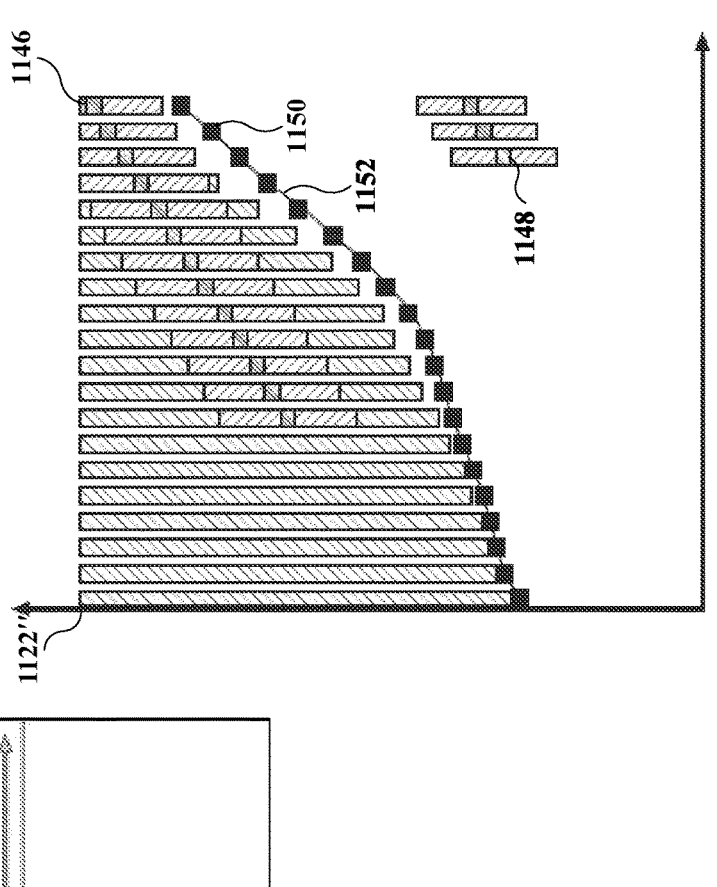

FIGS. 11A-11B illustrate an example 1100 of identifying speed plans based on occupancy grids. The example 1100 illustrates how occupancy grids are changed as a scene 1102 evolves.

At a first time, the scene 1102 includes an AV 1104 that is traveling along a lane 1106 and is planned (based on a strategic speed plan) to turn westward onto a lane 1108 thereby crossing an intersection 1110. The scene 1102 includes a first along path vehicle 1112 and a second along path vehicle 1114 that are predicted to be traveling westward on the lane 1108. The scene 1102 also includes a first crossing vehicle 1116 and a second crossing vehicle 1118 that are predicted to be traveling eastward on a lane 1120. Accordingly, the OSP tool 312 of FIG. 3 generates an occupancy grid 1122.

The occupancy grid 1122 includes the planned locations of the AV 1104 based on the strategic speed plan, such as indicated by a vertical bar 1124; predicted locations (such a location 1126) of the first along path vehicle 1112 and distance buffers associated therewith; predicted locations (such a location 1128) of the second along path vehicle 1114 and distance buffers associated therewith; predicted locations (such a location 1130) of the first crossing vehicle 1116 and distance buffers associated therewith; and predicted locations (such a location 1132) of the second crossing vehicle 1118 and distance buffers associated therewith.

The occupancy grid 1122 also illustrates that a tactical speed plan that includes locations (such as a location 1134) has been identified (using A*, as described above) and smoothed (as illustrated by a smoothed speed plan 1136).

As the (smoothed) speed plan results in the AV 1104 having to stop (not explicitly shown) inside the intersection 1110, a virtual stop line 1138 causing the AV 1104 to stop at the beginning of the intersection 1110 is added and a new speed plan is generated. The updated occupancy grid 1122′ illustrates the locations (such as a location 1140) of the stop line and locations (such a location 1142) of an updated speed plan.

At a second time, and as shown in FIG. 11B, the scene 1102 has evolved such that the first along path vehicle 1112 and the first crossing vehicle 1116 are no longer in the scene; that the second along path vehicle 1114 has progressed to the location shown in FIG. 11B; that the second crossing vehicle 1118 has already passed the intersection 1110; and that a third along path vehicle 1144 has entered the scene. A new (updated) occupancy grid 1122″ is generated. The occupancy grid 1122″ includes new predicted locations (such as a location 1146) of the second along path vehicle 1114, predicted locations (such as a location 1148) of the third along path vehicle 1144, and distance buffers associated therewith. The occupancy grid 1122″ also illustrates that a tactical speed plan that includes locations (such as a location 1150) has been identified (using A*, as described above) and smoothed (as illustrated by a smoothed speed plan 1152).

Figure 12:
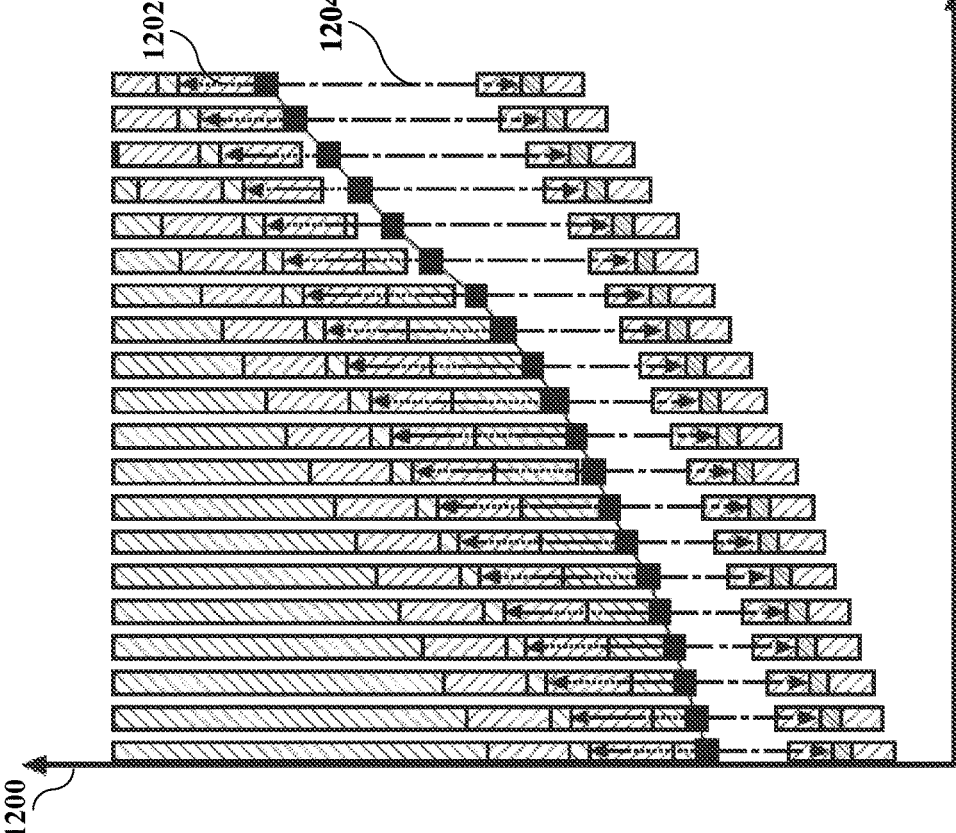
FIG. 12 is an example of an occupancy grid that illustrates upper and lower bounds used as constraints when searching for a speed plan.

FIG. 12 is an example of an occupancy grid 1200 that illustrates upper and lower bounds used as constraints when searching for a speed plan. At every time step, the upper bound constraint (such as an upper bound constraint illustrated by an upward pointing arrow 1202) is determined by searching upward from the estimated distance along the path of the AV, and the lower bound constraint (such as a lower bound constraint illustrated by a downward pointing arrow 1204) is determined by searching downward from each estimated distance along the path of the AV. It is noted that the occupancy grid 1200 is the same as the occupancy grid 612 and corresponds to the scene described with respect to FIG. 6. As already mentioned, an optimization problem is set up and solved to obtain the speed plan from the estimated speed plan (which, for brevity, may be the smoothed estimated speed plan).

The optimization problem can be separated into two parts: a cost function that is to be minimized and constraints on the optimization solution (e.g., that the optimization solution must adhere to). The result of the optimization problem is the estimated distances as a function of time along the path for the AV to follow in order to safely interact with the relevant world objects. Said another way, the solution to the optimization problem is a set of optimal velocities and optimal acceleration for the AV to follow in order to create a speed plan to adjust for world objects on the road.

The optimization problem performs a minimization optimization of a cost function, as shown in (3). The optimization problem of (3) is subject to the constraints (3a1)-(3d). In the following, $s_t$ denotes the distance along the path at a time step t, $v_t$ denotes the speed of the AV at the time step t, $a_t$ denotes the acceleration of the AV the time step t, and $S_t$ are slack values.

$$\min_{v,a,S} J(v_t, \ a_t, \ S_t), \ \text{subject to} \tag{3}$$

$$s_{t+1} = s_t + v_t dt_t + \frac{1}{2} a_t dt_t^2, \tag{3a1}$$

$$v_{t+1} = v_t + a_t dt_t, \tag{3a2}$$

$$sBV_t \le s_t + v_t \tau + S_t \le sLV_t + vLV_t dt_t + \frac{1}{2} aLV_t dt_t^2, \tag{3b}$$

$$s_{t+1} - s_t \ge 0, \tag{3c}$$

$$0 \le v_t \le v_{UL}, \ -2 \le a_t \le 2, \ -0.5 \le j_t \le 1.5, \ -1.5 \le S_t \le 1.5 \tag{3d}$$

The constraints (3a1)-(3a2) are kinematic constraints that define (e.g., set) a motion model for the optimization. The motion model (e.g., the constraints (3a1)-(3a2) ensure that the solved optimization values are physically possible for the AV to perform. The constraint (3a1) constrains the possible location of the AV at a next time step t+1 based on the location $s_t$, speed $v_t$, and acceleration at $a_t$ the time step t. The constraint (3a2) constrains the speed at the next time t+1 step given the AV's speed and acceleration at the time step t.

The constraint (3b), which may be referred to as the vehicle following constraint, sets a lead vehicle following constraint and ensures that the AV maintains a safe following distance from the lead vehicle (LV) (e.g., the leading vehicle 606 of FIG. 6) and is always ahead of the behind vehicle (BV) (e.g., the trailing vehicle 608 of FIG. 6). That is, the constraint (3b) sets the keeping distance away from a lead vehicle. The variables sBV, sLV, vLV, aLV (which indicate, respectively, a location of the behind vehicle, a location of the lead vehicle a speed of the lead vehicle, and an acceleration of the lead vehicle) are obtained (as constraint formulations) from the occupancy grid. The locations of the behind vehicle (sBV) set a lower bound on the location of the AV; and the locations of the lead world object set the upper bound. The locations of the lead world object is set/defined by the second equation of motion. The locations of the AV are defined by $s_t + v_t \tau + S_t$, where $\tau$ is the desired THW, which is obtained as described above, and $S_t$ are slack values. Thus, the locations of the AV are such that safe distances away from the lead world object are maintained. Upper and lower bounds are illustrated with respect to FIG. 12.

The constraint (3c) indicates that the AV is to be moving forward or is static (stopped) at all times. That is, the AV should not be moving backwards. That is, the future locations of the AV are always positive definite. Constraints (3d) set general variable constraints for the AV's velocity (the velocity $v_t$ should always be between 0 and a constant upper limit velocity value $v_{UL}$); extent of acceptable acceleration or deceleration of the AV at a given time (i.e., $-2 \le a_t \le 2$); extent of acceptable jerk of the AV at a given time (i.e., $-0.5 \le j_t \le 1.5$); and the range of the slack value at any given time step (i.e., $-1.5 \le S_t \le 1.5$). The constraints (3d) ensure that the optimized values are within the safety limits set by the constraints (3d). While certain limits are described herein, others are possible.

The cost function $J(v_t, a_t, S_t)$ can be as shown equation (4). The cost function essentially turns a desired experience (e.g., comfort) of occupants of the AV into equation form.

$$J = \omega_1 dV(v_t - v_{t-1})^2 + \omega_2 dA(a_t - a_{t-1})^2 + \tag{4}$$
$$\omega_3 V(v_t - v_{des,t})^2 + \omega_4 A(a_t - a_{des,t})^2 + \omega_5 S(S_t)^2$$

The expression $\omega dV(v_t - v_{t-1})^2$ results in a minimization of the change in velocity of the AV for a smooth speed plan. The expression $\omega dA(a_t - a_{t-1})^2$ results in the minimization of the change in acceleration of the AV for a smooth speed plan. The expression $\omega V(v_t - v_{des,t})^2$ results in the minimization of the differences between the velocities of the strategic speed plan and the optimized (e.g., determined) velocities. The expression $\omega A(a_t - a_{des,t})^2$ results in the minimization of the differences from strategic speed plan acceleration and the optimized (e.g., determined) accelerations. The expression $\omega S(S_t)^2$ minimizes the slack therewith resulting in a minimizing error. The values $\omega_i$ represent respective weights of each term in the cost function. The weights $\omega_i$ are positive definite numbers that define how heavily to value the respective terms in the cost function. For example, a higher weight for minimizing change in velocity/acceleration compared to the weight in following the speed plan results in prioritizing a smooth speed plan more than following the strategic speed plan.

To further describe some implementations in greater detail, reference is next made to examples of techniques which may be performed by or using a system for constraint-based speed profile. FIG. 13 is a flowchart of an example of a technique 1300 for generating a speed profile of for an autonomous vehicle. The technique 1300 can be executed using devices, such as the systems, hardware, and software described with respect to FIGS. 1-12. The technique 1300 can be performed, for example, by executing a machine-readable program or other computer-executable instructions, such as routines, instructions, programs, or other code. The steps, or operations, of the technique 1300, or another technique, method, process, or algorithm described in connection with the implementations disclosed herein can be implemented directly in hardware, firmware, software executed by hardware, circuitry, or a combination thereof.

For simplicity of explanation, the technique 1300 is depicted and described herein as a series of steps or operations. However, the steps or operations of the technique 1300 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1302, planned locations of the AV are placed in an occupancy grid. As described above, the planned locations are based on a strategic speed plan that is determined without taking world objects into account. As described above, the world objects are those that may interfere with the path of the AV. The planned locations that are added to the occupancy grid correspond to locations at future time steps in a planning window.

At 1304, predicted locations of the world objects are placed in the occupancy grid, as described above. The predicted locations are those that correspond to at least some of the future time steps. At 1306, respective buffer distances corresponding to the predicted locations are added to the occupancy grid. At 1308, an estimated speed plan is obtained for the AV based on the occupancy grid. The estimated speed plan may be a smooth speed plan. The estimated speed plan can be obtained using the A* search algorithm. At 1310, the speed plan (i.e., the short-term or tactical speed plan) is obtained from the estimated speed plan. As described above, the speed plan can be obtained (e.g., solved for) by formulating an optimization problem that minimizes a change in velocity of the AV, minimizes an acceleration change of the AV, and minimizes differences from the strategic speed plan. The optimization problem can use, as constraints, kinematic constraints of the AV and distance constraints related to distances between the AV and relevant other road users.

At 1312, the AV is controlled according to the speed plan. Controlling the AV according to the speed plan can include, and as described above with respect to a virtual stop line, in response to determining that the speed plan causes the AV to stop in an intersection, causing the AV to stop at a virtual stop line that is added to the occupancy grid; continually updating the occupancy grid and identifying an updated speed plan until the updated speed plan is such that the AV does not stop in the intersection; and controlling the AV according to the updated speed plan.

While not specifically shown in FIG. 13, the technique 1300 can be continuously performed (such as at every time step) while the AV is being autonomously controlled.

A world object of the world objects may be identified as an along path world object. In such a case, the respective buffer distances corresponding to the world object can be based on a time headway to the world object. A world object may be identified as a crossing world object. In such a case, the respective buffer distances corresponding to the world object can be based on a time to collision between the AV and the world object.

As described above, in response to determining that a crossing lane is obstructed to sensors of the AV, the technique 1300 may place a virtual along path vehicle in the occupancy grid.

For simplicity of explanation, each technique herein is depicted and described as a series of operations. However, the operations in accordance with this disclosure can occur in various orders and/or concurrently. Additionally, other steps or operations not presented and described herein may be used. Furthermore, not all illustrated operations may be required to implement a technique in accordance with the disclosed subject matter.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for determining a speed plan for an autonomous vehicle (AV), comprising:
    placing, for future time steps, planned locations of the AV in an occupancy grid, wherein the planned locations are based on a strategic speed plan that is determined without taking world objects into account;
    placing, for at least some of the future time steps, predicted locations of the world objects in the occupancy grid;
    adding respective buffer distances corresponding to the predicted locations in the occupancy grid;
    adding virtual predictions to the occupancy grid, wherein the virtual predictions include a predicted path of virtual lead vehicles or virtual world objects;
    obtaining an estimated speed plan for the AV based on the occupancy grid;
    obtaining the speed plan from the estimated speed plan;
    controlling the AV according to the speed plan;

generating a tactical speed plan based upon an intersection with the virtual lead vehicles or the virtual world objects; and modifying the speed plan for a discrete time step based on the tactical speed plan until the virtual lead vehicles or the virtual world objects are removed from the occupancy grid.

2. The method of claim 1, further comprising:

identifying a world object of the world objects as an along path world object, wherein the respective buffer distances corresponding to the world object are based on a time headway to the world object.

3. The method of claim 1, further comprising:

identifying a world object of the world objects as a crossing world object, wherein the respective buffer distances corresponding to the world object are based on a time to collision between the AV and the world object.

4. The method of claim 1, wherein the speed plan is obtained by solving an optimization problem that minimizes a change in velocity of the AV, minimizes an acceleration change of the AV, and minimizes differences from the strategic speed plan.

5. The method of claim 4, wherein the optimization problem uses kinematic constraints of the AV, and distance constraints related to distances between the AV and an along path vehicle.

6. The method of claim 1, further comprising:

in response to determining that a crossing lane is obstructed to sensors of the AV, placing a virtual along path vehicle in the occupancy grid.

7. The method of claim 1, wherein controlling the AV according to the speed plan comprises:

in response to determining that the speed plan causes the AV to stop in an intersection:

causing the AV to stop at a virtual stop line that is added to the occupancy grid;

continually updating the occupancy grid and identifying an updated speed plan until the updated speed plan is such that the AV does not stop in the intersection; and controlling the AV according to the updated speed plan.

8. An autonomous vehicle (AV), comprising:

a memory; and a processor, the processor configured to execute instructions stored in the memory to determine a speed plan for the AV, the instructions comprise:

placing, for future time steps, planned locations of the AV in an occupancy grid, wherein the planned locations are based on a strategic speed plan that is determined without taking world objects into account;

placing, for at least some of the future time steps, predicted locations of the world objects in the occupancy grid;

adding respective buffer distances corresponding to the predicted locations in the occupancy grid;

adding virtual predictions to the occupancy grid, wherein the virtual predictions include a predicted path of virtual lead vehicles or virtual world objects;

obtaining an estimated speed plan for the AV based on the occupancy grid;

obtaining the speed plan from the estimated speed plan;

controlling the AV according to the speed plan;

generating a tactical speed plan, with an optimized speed plan tool (OSP), based upon an intersection with the virtual lead vehicles or the virtual world objects; and modifying the speed plan for a discrete time based on the tactical speed plan until the virtual lead vehicles or the virtual world objects are removed from the occupancy grid.

9. The AV of claim 8, wherein the processor is further configured to execute instruction to:

identify a world object of the world objects as an along path world object, wherein the respective buffer distances corresponding to the world object are based on a time headway to the world object.

10. The AV of claim 8, wherein the processor is further configured to execute instruction to:

identify a world object of the world objects as a crossing world object, wherein the respective buffer distances corresponding to the world object are based on a time to collision between the AV and the world object.

11. The AV of claim 8, wherein the speed plan is obtained by solving an optimization problem that minimizes a change in velocity of the AV, minimizes an acceleration change of the AV, and minimizes differences from the strategic speed plan.

12. The AV of claim 11, wherein the optimization problem uses kinematic constraints of the AV, and distance constraints related to distances between the AV and an along path vehicle.

13. The AV of claim 8, wherein the processor is further configured to execute instruction to:

in response to determining that a crossing lane is obstructed to sensors of the AV, place a virtual along path vehicle in the occupancy grid.

14. The AV of claim 8, wherein to control the AV according to the speed plan comprises to:

in response to determining that the speed plan causes the AV to stop in an intersection:

cause the AV to stop at a virtual stop line that is added to the occupancy grid;

continually update the occupancy grid and identifying an updated speed plan until the updated speed plan is such that the AV does not stop in the intersection; and control the AV according to the updated speed plan.

15. A non-transitory computer-readable medium storing instructions operable to cause one or more processors to perform operations for determining a speed plan for an autonomous vehicle (AV), the operations comprising:

placing, for future time steps, planned locations of the AV in an occupancy grid, wherein the planned locations are based on a strategic speed plan that is determined without taking world objects into account;

placing, for at least some of the future time steps, predicted locations of the world objects in the occupancy grid;

adding respective buffer distances corresponding to the predicted locations in the occupancy grid;

adding virtual predictions to the occupancy grid, wherein the virtual predictions include a predicted path of virtual lead vehicles or virtual world objects;

obtaining an estimated speed plan for the AV based on the occupancy grid;

obtaining the speed plan from the estimated speed plan;

controlling the AV according to the speed plan;

generating a tactical speed plan based upon an intersection with the virtual lead vehicles or the virtual world objects; and modifying the speed plan for a discrete time based on the tactical speed plan until the virtual lead vehicles or the virtual world objects are removed from the occupancy grid.

16. The non-transitory computer-readable medium of claim 15, wherein the operations further comprise:

identifying a world object of the world objects as an along path world object, wherein the respective buffer distances corresponding to the world object are based on a time headway to the world object.

17. The non-transitory computer-readable medium of claim 15, wherein the operations further comprise:

identifying a world object of the world objects as a crossing world object, wherein the respective buffer distances corresponding to the world object are based on a time to collision between the AV and the world object.

18. The non-transitory computer-readable medium of claim 15, wherein the speed plan is identified by solving an optimization problem that minimizes a change in velocity of the AV, minimizes an acceleration change of the AV, and minimizes differences from the strategic speed plan, and wherein the optimization problem uses kinematic constraints of the AV, and distance constraints related to distances between the AV and an along path vehicle.

19. The non-transitory computer-readable medium of claim 15, wherein the operations further comprise:

in response to determining that a crossing lane is obstructed to sensors of the AV, placing a virtual along path vehicle in the occupancy grid.

20. The non-transitory computer-readable medium of claim 15, wherein controlling the AV according to the speed plan comprises:

in response to determining that the speed plan causes the AV to stop in an intersection:

causing the AV to stop at a virtual stop line that is added to the occupancy grid;

continually updating the occupancy grid and identifying an updated speed plan until the updated speed plan is such that the AV does not stop in the intersection; and controlling the AV according to the updated speed plan.

* * * * *